United States Patent
Aigner et al.

(10) Patent No.: US 11,648,890 B2
(45) Date of Patent: May 16, 2023

(54) TRIM COMPONENT FOR AN INTERIOR OF A MOTOR VEHICLE, INTERIOR COMPONENT FOR THE INTERIOR, MOTOR VEHICLE, AND METHOD FOR PRODUCING A TRIM COMPONENT FOR AN INTERIOR OF A MOTOR VEHICLE

(71) Applicant: Bayerische Motoren Werke Aktiengesellschaft, Munich (DE)

(72) Inventors: Ralf Aigner, Ergolding (DE); Stefan Fischer, Geisenhausen (DE); Dienhung Huynh, Landshut-Auloh (DE); Markus Haering, Moosburg (DE); Bruno Roth, Landshut (DE); Martin Schwabl, Hohenthann (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 248 days.

(21) Appl. No.: 17/095,457

(22) Filed: Nov. 11, 2020

(65) Prior Publication Data

US 2021/0146858 A1    May 20, 2021

(30) Foreign Application Priority Data

Nov. 15, 2019   (DE) .................... 10 2019 130 826.7

(51) Int. Cl.
*B60R 13/02* (2006.01)
*B62D 29/04* (2006.01)
(Continued)

(52) U.S. Cl.
CPC .... *B60R 13/0206* (2013.01); *B29C 45/14065* (2013.01); *B60Q 3/54* (2017.02);
(Continued)

(58) Field of Classification Search
CPC ........ B60R 13/0206; B60R 2013/0287; B60R 13/02; B29C 45/14065; B29C 45/14336;
(Continued)

(56) References Cited

U.S. PATENT DOCUMENTS 10,737,561 B2 *  8/2020  Renn ...................... B60J 1/2013
11,338,543 B2 *  5/2022  Juenemann ............. B32B 27/12
(Continued)

FOREIGN PATENT DOCUMENTS

| DE | 20 2015 100 322 U1 | 2/2016 |
| DE | 10 2016 001 978 A1 | 8/2017 |
| DE | 10 2016 106 539 A1 | 10/2017 |

OTHER PUBLICATIONS

German Search Report issued in German application No. 10 2019 130 826.7 dated Jul. 29, 2020, with Statement of Relevancy (Nine (9) pages).

*Primary Examiner* — Pinel E Romain
(74) *Attorney, Agent, or Firm* — Crowell & Moring LLP (57) ABSTRACT

A trim component for an interior of a motor vehicle has a film and has a carrier from a thermoplastic plastics material. The film has a relief structure, the carrier has a lattice structure having lattice members, and the carrier is back-molded on a rear side of the film such that the lattice members are connected in a materially integral manner to the rear side of the film.

8 Claims, 9 Drawing Sheets

(51) Int. Cl.
  *B60Q 3/54* (2017.01)
  *B29C 45/14* (2006.01)
  *B29L 31/30* (2006.01)
  *B29K 101/12* (2006.01)
  *B29K 701/12* (2006.01)

(52) U.S. Cl.
  CPC ........ *B62D 29/041* (2013.01); *B29K 2101/12* (2013.01); *B29K 2701/12* (2013.01); *B29L 2031/302* (2013.01); *B60R 2013/0287* (2013.01)

(58) Field of Classification Search
  CPC ...... B29C 2045/14442; B29C 45/1418; B60Q 3/54; B62D 29/041; B29K 2101/12; B29K 2701/12; B29L 2031/302; B29L 2031/3008; B29L 2031/3014; B29L 2031/3041
  USPC ....................................................... 296/1.08
  See application file for complete search history.

(56) References Cited

U.S. PATENT DOCUMENTS

| | | |
|---|---|---|
| 2017/0291536 A1 | 10/2017 | Cannon |
| 2019/0283667 A1* | 9/2019 | Eitel ....................... B32B 27/12 |

* cited by examiner

TRIM COMPONENT FOR AN INTERIOR OF A MOTOR VEHICLE, INTERIOR COMPONENT FOR THE INTERIOR, MOTOR VEHICLE, AND METHOD FOR PRODUCING A TRIM COMPONENT FOR AN INTERIOR OF A MOTOR VEHICLE

CROSS REFERENCE TO RELATED APPLICATION

This application claims priority under 35 U.S.C. § 119 from German Patent Application No. 10 2019 130 826.7, filed Nov. 15, 2019, the entire disclosure of which is herein expressly incorporated by reference.

BACKGROUND AND SUMMARY OF THE INVENTION

The present invention relates to a trim component for an interior of a motor vehicle. The invention furthermore relates to an interior component for an interior of a motor vehicle having such a trim component, as well as to a motor vehicle having such a trim component or such an interior component. The invention moreover relates to a method for producing a trim component.

In the construction of the interior of motor vehicles there is a trend toward staging lighting moods on the interior. Lighting moods staged in this manner can be represented on corresponding interior faces of the interior, for example on a door trim of a door or on the dashboard, thus on trim components in the interior of the motor vehicle. This can take place, for example, by daylight, ambient light, for example street lighting, and the like, which is reflected on the interior faces. In order for the staging of light moods to be enhanced with particular effects, the interior face, or the trim component, respectively, can be produced using a special material, for example a shiny material, or a structure on which the light is refracted in a particular manner. Furthermore, the interior face can be radiated with incident light from the interior space of the motor vehicle, for example special light-emitting diodes or fluorescent tubes.

It is an object of the present invention to provide a trim component which can be produced in a simple manner at high quality and in a cost-effective manner as well as an interior component, the trim component and the interior component enabling particularly effective staging of light moods in the interior space of the motor vehicle.

Features and details which are described in the context of the trim component herein of course also apply in the context of the interior component according to the invention, the motor vehicle according to the invention, as well as the method according to the invention and vice versa, respectively, such that reciprocal reference is always made, or can always be made, in respect of the disclosure of the individual aspects of the invention.

According to a first aspect of the invention the object is achieved by a trim component for an interior of a motor vehicle, wherein the trim component has a film and the trim component has a carrier from a thermoplastic plastics material, and wherein the film has a relief structure, the carrier has a lattice structure having lattice members, and the carrier is back-molded on a rear side of the film in such a manner that the lattice members are connected in a materially integral manner to the rear side of the film.

Accordingly, in accordance with the invention, a trim component which can be produced in a simple manner at high quality and in a cost-effective manner is provided, the trim component by virtue of the relief structure herein enabling effective staging of light moods in the interior space of the motor vehicle. Furthermore, light can penetrate the film and on account thereof enable particularly effective staging of light moods. The light herein can emanate, for example, from daylight, from the environment, for example from street lighting, or from a light unit in the interior space of the motor vehicle. It is possible for the film of the trim component by means of a corresponding light unit to be radiated and for the light to shine through from a front side of the film or from a rear side of the film.

The rear side of the film of the trim component is a fastening side or an assembly side which is not visible in the interior space of the motor vehicle. In contrast, the front side of the film of the trim component is the visible side on the interior of the motor vehicle. The relief structure is accordingly viewed from the front side and the carrier remains obscured. The front side thus lies opposite the rear side.

The interior of the motor vehicle describes an interior specification of the motor vehicle in the interior space thereof. The specification includes, for example, doors, a dashboard, a central console, a roof, seats, and the like in the interior space of the motor vehicle. Accordingly, the trim component can be, for example, a door trim component, a dashboard trim component, a central console trim component, etc., the trim component herein can be configured or molded, respectively, as a trim strip, for example.

It is preferable for the lattice members to enclose lattice voids, wherein the film in a region of the lattice voids in relation to the lattice members has elevations and/or depressions which form the relief structure. Elevations are configured so as to be convex in relation to the lattice members or the carrier, respectively. Depressions are configured so as to be concave in relation to the lattice members or the carrier, respectively, and accordingly protrude between the lattice members.

The lattice members are in particular disposed relative to one another such that the lattice members configure the lattice structure. The lattice members can be disposed relative to one another so as to be, for example, mutually parallel and/or oblique, in particular rectangular. Rectangular lattice voids result in the case of a parallel and oblique arrangement of the lattice members relative to one another. Accordingly, elevations and/or depressions of the film have a rectangular base area. The lattice members can alternatively be radiused. On account thereof, round, in particular circular or oval, lattice voids can be configured in the lattice structure, for example. Accordingly, elevations and/or depressions in the film have a round base area. For example, it is also possible for the lattice members to be configured in such a manner that a honeycomb-shaped lattice structure results. Accordingly, the elevations and/or depressions have a honeycomb-shaped base area. Consequently, different lattice structures can be implemented, the latter being able to be chosen depending on the requirements of the trim component in terms of strength and on the desired visual appeal of the relief structure.

It is furthermore preferable for the film to be permeable to light. Configured as a light-permeable film, the film can be penetrated by light, the latter radiating in particular so as to be incident on the rear side of the film, so as to generate particularly effective staging of light moods on the relief structure. In order for the light-permeable effect of the film to be improved, the film can be configured so as to be transparent and/or naturally clouded. A film is transparent when it is possible to see through the film when the latter is illuminated. A film such as from polypropylene, for example, is naturally clouded when the film is produced without any additional color particles and therefore has the natural hue of the material from which the film is produced.

It is moreover preferable for the film to have a thickness in the range from 0.3 mm to 3 mm. It is particularly preferable for the film to have a thickness in the range from 0.4 mm to 2 mm, furthermore particularly in the range from 0.6 mm to 1.4 mm. A stable, lightweight film which is resistant to external mechanical influences and through which light can readily shine is provided on account thereof.

It is moreover preferable for the film to be composed of a thermoplastic plastics material, in particular polypropylene. The film can be configured in a correspondingly cost-effective manner. Alternatively, it is possible for the film to be made from a thermoplastic plastics material other than polypropylene, or from another material, for example a metal such as, for example, aluminum, from a composite material, from a synthetic material, from a natural material such as, for example, leather, or the like.

It is furthermore preferable for the carrier to have at least one fastening means, in particular a clip, which for fastening to a receptacle means of a component of the interior of the motor vehicle that corresponds to the fastening means is integrally molded on the carrier. This further reduces the costs in the production of the trim component and enables simple fastening to the component of the interior.

It is finally preferable for a front side of the film to be laminated with an upper material. The upper material can in particular be adhesively bonded to the front side of the film by means of an adhesive. This permits the visual appeal on the front side of the trim component to be varied. Accordingly, a trim component can be made using a film material of the film and subsequently be laminated with dissimilar upper materials for dissimilar interiors. This enables a highly cost-effective production of trim components with a great diversity in options in terms of the optical appearance and the haptics of the trim components. Furthermore, a material which is easy to process and/or cost-effective can be utilized for the film, while a comparatively expensive material or substance is chosen only for the upper material which determines the visual appeal and the haptics. For example, a metal such as, for example aluminum, a composite material such as, for example carbon, a synthetic material, a natural material such as, for example leather, or the like can be utilized as the upper material.

According to a second aspect of the invention the object is achieved by an interior component for an interior of a motor vehicle having a trim component according to the invention and at least one light unit, wherein the at least one light unit is disposed behind the rear side of the film in such a manner that the at least one light unit is specified for shining through the film from the rear side.

All of the advantages which have already been described in the context of the trim component according to the first aspect of the invention are derived in the interior component according to the second aspect of the invention. Particularly effective staging of light moods herein can be provided in that the film is radiated with incident light on the rear side thereof, the light shining through from the rear side to the front side. This enables a visually particularly appealing refraction of light on the relief structure of the film.

The at least one light unit herein can be configured, for example, as a light-emitting diode, a fluorescent tube, a gas-discharge lamp, an incandescent lamp, or the like. The light unit can in particular be configured in such a manner that the color and/or the intensity of the light of the former can be adjusted. For example, one light unit can in each case be disposed in a region of each one of the lattice voids, or on each one of the elevations or depressions, respectively.

The interior component can be, for example, an internal door card, a dashboard, a central console, or the like.

According to a third aspect of the invention the object is achieved by a motor vehicle having a trim component according to the invention or an interior component according to the invention.

All of the advantages which have already been described in the context of the trim component according to the first aspect of the invention or the interior component according to the second aspect of the invention are derived in the motor vehicle according to the third aspect of the invention.

According to a fourth aspect of the invention the object is achieved by a method for producing a trim component for an interior of a motor vehicle, wherein the method comprises the following steps: (a) disposing a film between a first tool part having a relief structure and a second tool part having a lattice structure and having an injection nozzle that is fluidically connected to the lattice structure; (b) clamping the film between the first tool part and the second tool part; and (c) back-molding a rear side of the film with a thermoplastic material from the injection nozzle such that the thermoplastic material is molded so as to form a carrier having the lattice structure, wherein the lattice structure has lattice members and the carrier is back-molded on the rear side of the film in such a manner that the lattice members are connected in a materially integral manner to the rear side of the film, the film and the carrier configuring the trim component.

All of the advantages which have already been described in the context of the trim component according to the first aspect of the invention are derived in the method according to the fourth aspect of the invention. The film can be converted to the corresponding relief structure in a simple and cost-effective manner by way of the back-molding. Likewise, the carrier can be attached to the film in a particularly simple manner. No additional adhesive or the like is required for connecting the carrier to the film. In particular, the film can therefore be connected to the lattice structure in a materially integral manner solely by means of the thermoplastic material of the back-molded lattice structure.

The film herein can be pre-heated prior to being disposed, prior to being clamped, and/or prior to being back-molded. This enables lower production costs. Alternatively, the film may be pre-heated prior to being disposed, prior to being clamped, and/or prior to being back-molded so as to improve the forming capability of the film.

The relief structure of the first tool is a first tool surface. The second tool part, in a manner corresponding to this relief structure or tool surface, respectively, can be shaped so as to have a second tool surface. The relief structure of the film in this instance is generated by pressing the second tool surface onto the first tool surface when a smooth or flat, respectively, film is disposed between the first tool part and the second tool part. Alternatively, it is possible for a film which is at least partially or completely pre-molded with the relief structure to be disposed between the tool parts, the film in this instance no longer being molded by the tool parts, or only being partially further molded. The lattice structure can accordingly be a structure of ducts for the thermoplastic material behind the second tool surface, the thermoplastic material during the back-molding flowing through the ducts and curing in the latter so as to generate the lattice structure.

In a further step it can be provided that the front side of the film is laminated with an upper material. The upper material can in particular be adhesively bonded to the front side of the film by means of an adhesive. To this end, the upper material can be pre-molded so as to correspond to the relief structure of the film before the upper material is adhesively bonded to the front side of the film. It is also possible for the upper material to be placed on the film while the film is being back-molded with the thermoplastic material of the carrier.

An exemplary embodiment of a trim component according to the invention, an exemplary embodiment of an interior component according to the invention, an exemplary embodiment of a motor vehicle according to the invention, and an exemplary embodiment of a method according to the invention will be explained in more detail hereunder by means of drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Elements with the same function and mode of action are in each case provided with the same reference signs in FIGS. 1 to 9.

Figure 1:
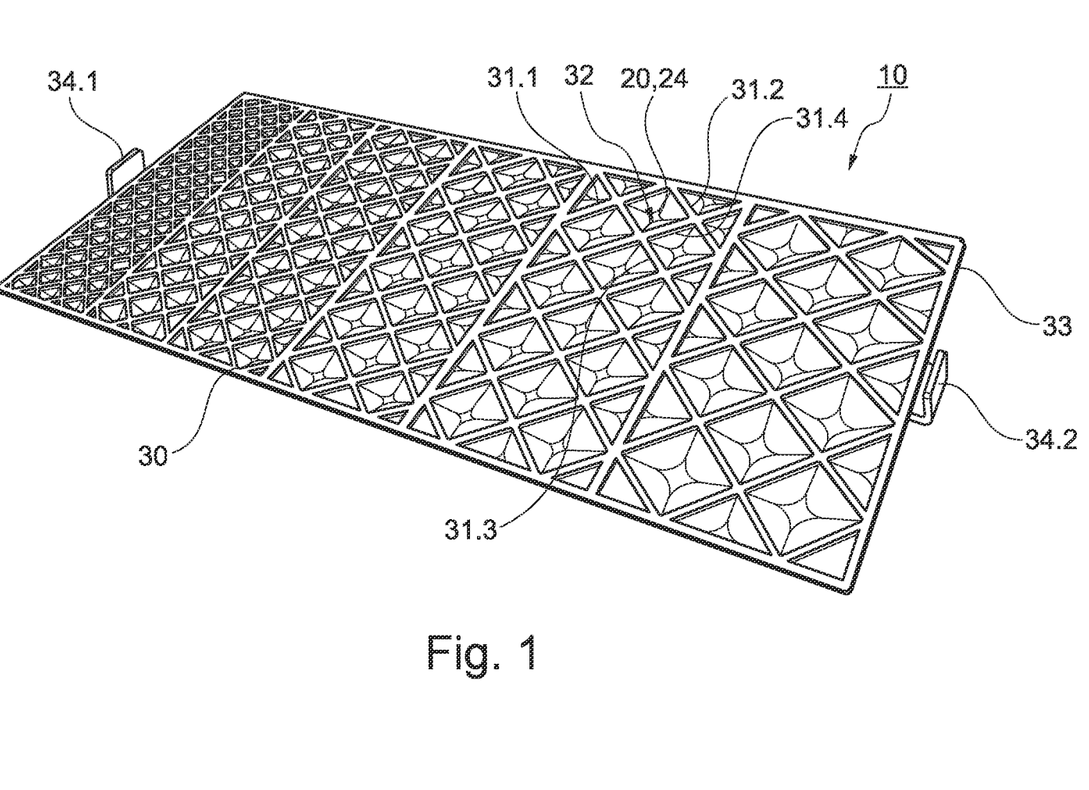
FIG. 1 in a perspective lateral view shows a rear side of a first exemplary embodiment of a trim component according to the invention.

FIG. 1 in a perspective lateral view shows a rear side of a first exemplary embodiment of a trim component 10 according to the invention. The trim component 10 according to the invention has a film 20 and a carrier 30. The film 20 by way of the rear side 24 thereof is connected in a materially integral manner to the carrier 30.

In the present first exemplary embodiment, the film 20 is produced from a light-permeable and naturally clouded plastics material film, in particular from polypropylene. The thickness of the film 20 in the present first exemplary embodiment is consistent across the face of the film 20. Furthermore, the thickness of the film 20 in this first exemplary embodiment is approx. 1 mm. The carrier 30 in the first exemplary embodiment is likewise produced from polypropylene and is of a black color.

Figure 3:
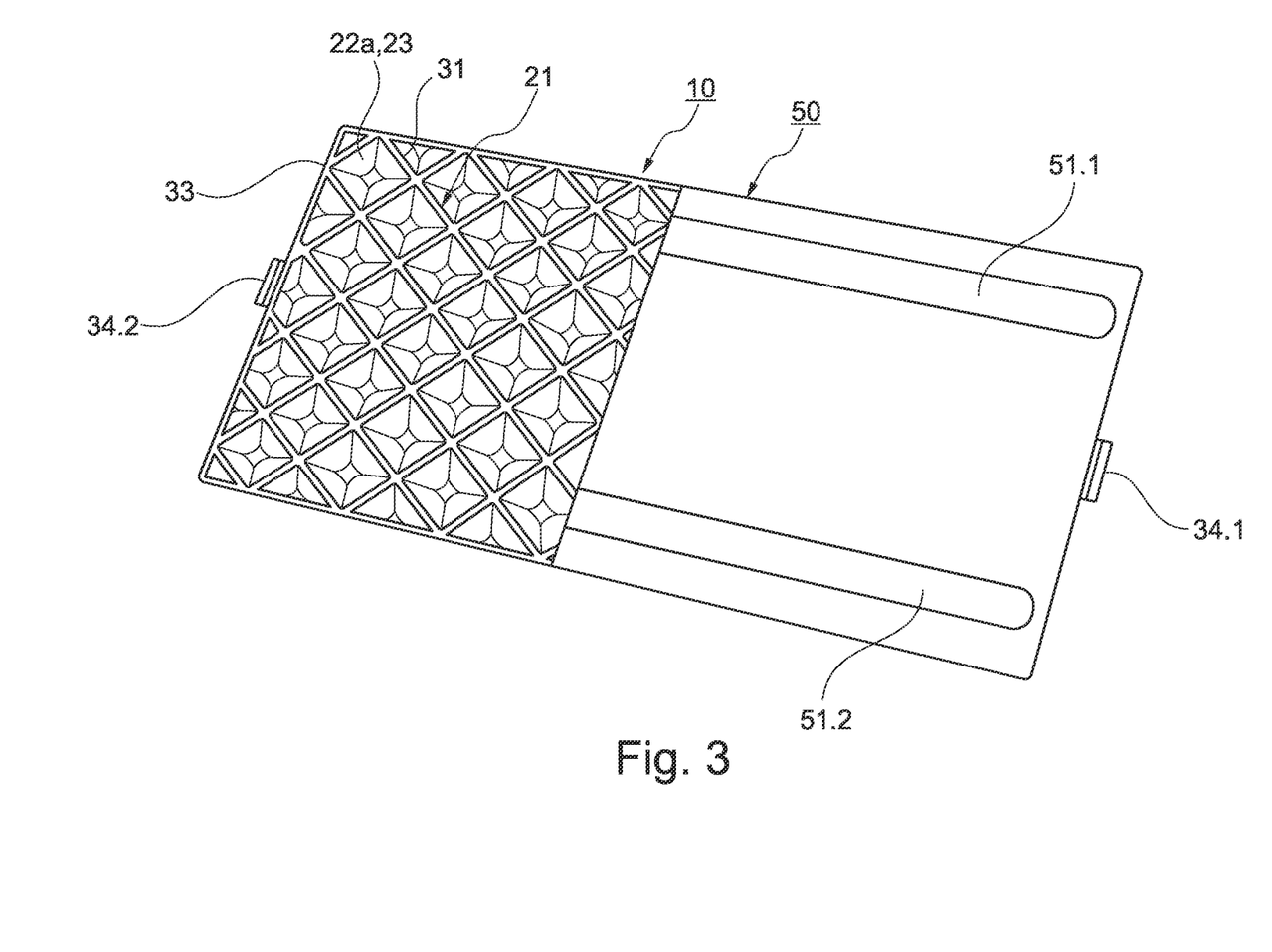
FIG. 3 in a perspective and partially sectional lateral view shows a front side of an interior component having the trim component from FIG. 1.

The carrier 30 has a plurality of lattice members 31 of which the lattice members 31.1, 31.2, 31.3, 31.4 are identified in an exemplary manner. Lattice voids 32 are configured between the lattice members 31, where the carrier 30 does not have any material. Only the lattice void 32 which is enclosed by the lattice members 31.1, 31.2, 31.3, 31.4 herein is identified in an exemplary manner. The film 20 in the region of the lattice voids 32, or between the lattice members 31 enclosing the latter, respectively, is raised in relation to the lattice members 31. In other words, the film 20 is molded so as to be convex between the lattice members 31. Accordingly, this results in a relief structure 21 of the film 20, having a multiplicity of elevations 22a as can be seen in FIG. 3, the latter showing a front side 23 of the film 20. However, the film 20 bears in a planar manner on the lattice members 31 and is connected in a materially integral manner to the lattice members 31, since the carrier 30 is back-molded on the rear side 24 of the film 20. An exemplary embodiment pertaining to the production of the trim component 10 by means of back-molding will be explained in detail hereunder with reference to FIGS. 6 to 9.

The carrier 30 has a frame 33 which delimits or borders, respectively, the carrier 30 and on which the lattice members 31 are disposed. In the present case, the lattice members 31 are disposed so as to be oblique relative to the frame. Moreover, the lattice members 31 are disposed so as to be mutually oblique, in particular so as to be at a right angle to one another, such that a diamond-shaped lattice structure results along the trim component 10. The lattice members 31 are moreover disposed so as to be mutually parallel. Moreover, a plurality of lattice members 31 are disposed at a right angle so as to form long frame sides of the frame 33 of rectangular shape. The lattice members 31 ensure an enhanced strength and a less uniform and thus more appealing relief structure 21 of the film 20. Furthermore, these lattice members 31 which are disposed at a right angle in relation to the long frame sides have dissimilar mutual spacings and thus form regions of dissimilar sizes having the elevations 22a.

One of two fastening means 34.1, 34.2 is in each case situated on the carrier 30 on each of the longitudinal ends of the trim component 10, or the short frame sides of the frame 33, respectively. The fastening means 34.1, 34.2 are presently configured as clips. The clips serve for fastening the trim component 10 to corresponding receptacle means (not shown) of a component (not shown) of the interior of the motor vehicle 70. The frame 33, the lattice members 31, and the fastening means 34 herein are produced so as to be integral, or monolithic, respectively. The frame 33 and/or the lattice members 31 can have further or other fastening means 34, for example in the form of clips, welded beads, screw domes, etc.

Figure 2:
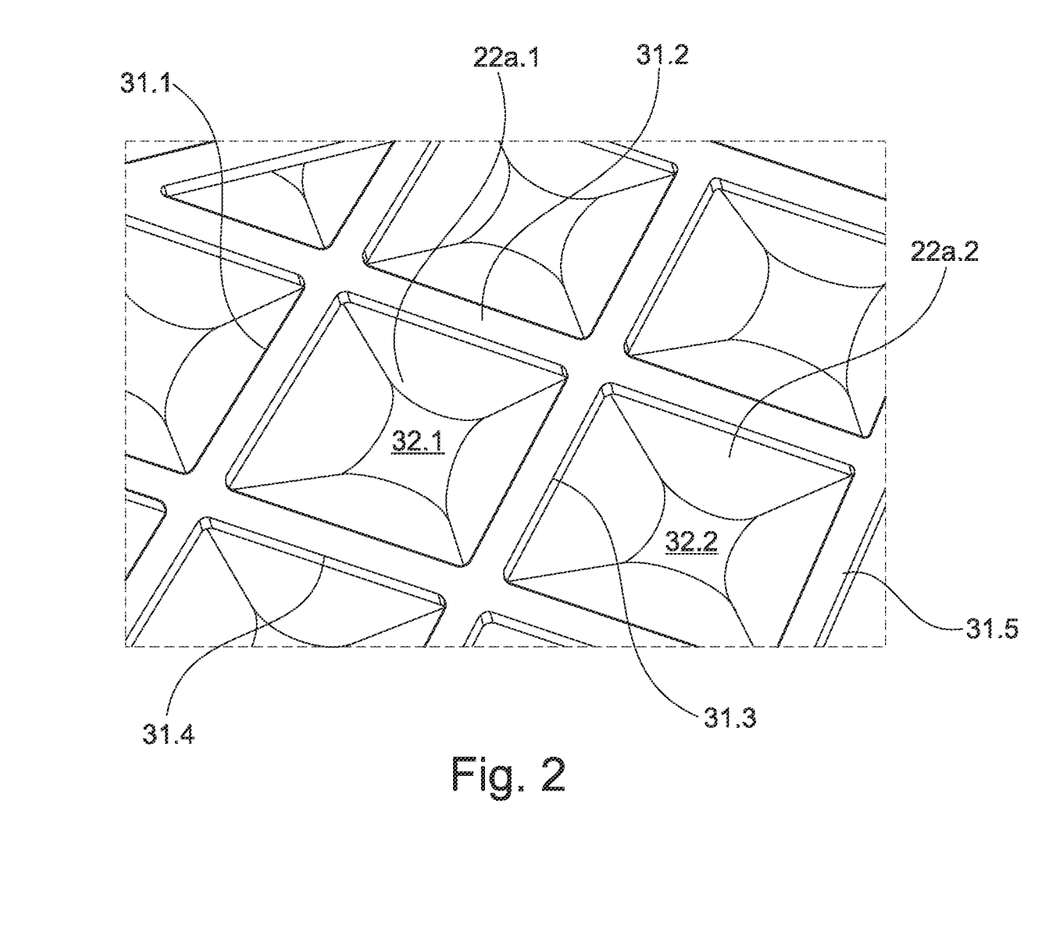
FIG. 2 shows a fragment of the trim component from FIG. 1.

FIG. 2 shows a fragment of the trim component 10 from FIG. 1. The two lattice voids 32.1, 32.2 which are enclosed by the identified respective lattice members 31.1, 31.2, 31.3, 31.4, 31.5 are identified herein. As can be seen, the film 20 in the region of the lattice voids 32.1, 32.2 bulges into the image plane. The film 20 here thus configures the elevations 22a.1, 22a.2 in relation to the lattice members 31.1, 31.2, 31.3, 31.4, 31.5, the lattice members surrounding the elevations. Alternatively, it is possible for the film 20 in the region of the lattice voids 32.1, 32.2 to be configured so as to bulge out of the image plane. On account thereof, depressions instead of the elevations 22a.1, 22a.2 are configured in relation to the lattice members 31.1, 31.2, 31.3, 31.4, 31.5.

FIG. 3 in a perspective and partially sectional lateral view shows a front side of an interior component 50 having the trim component 10 from FIG. 1. The relief structure 21 having the elevations 22a on the front side 23 of the film 20 can be seen even better in this view.

The interior component 50 is cut away to the right of the relief structure 21, or of the trim component 10, respectively, and shows a view behind the film 20 and the carrier 30. Two light units 51.1, 51.2 are disposed behind the trim component 10. The light units 51.1, 51.2 in this exemplary embodiment are configured in an exemplary manner as fluorescent tubes. The light units 51.1, 51.2 are disposed in such a manner that they illuminate the rear side 24 of the film 20. The light units 51.1, 51.2 can be fastened, for example, to the carrier 30 or to another component of the interior component 50.

Figure 4:
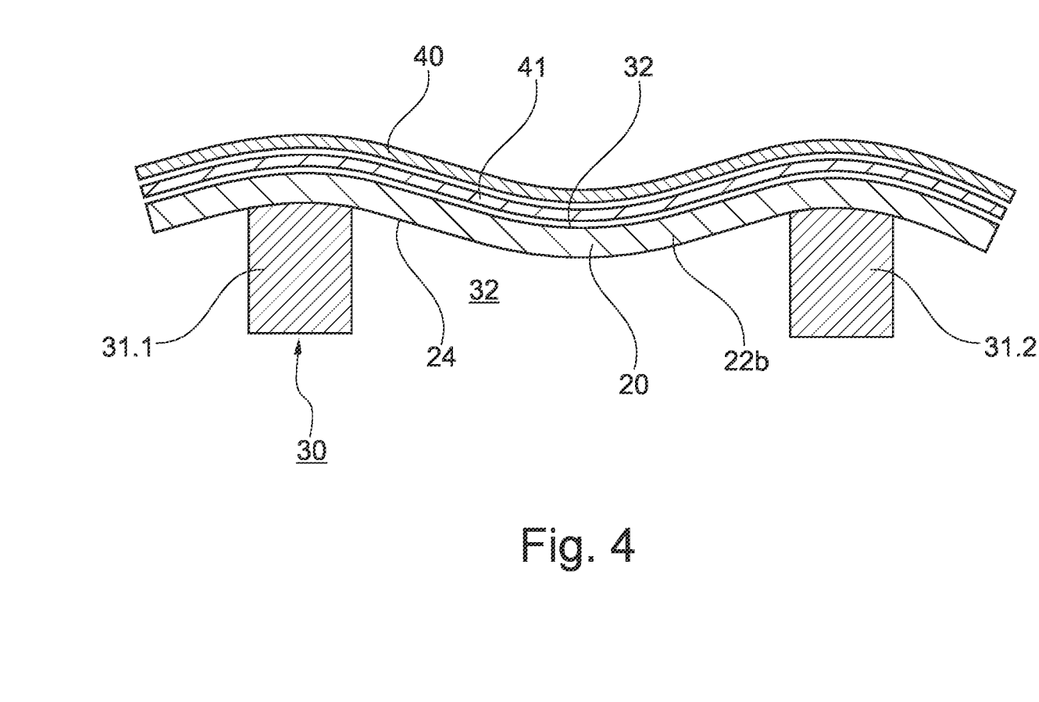
FIG. 4 in a sectional view shows a fragment of a second exemplary embodiment of a trim component according to the invention.

FIG. 4 in a sectional view shows a fragment of a second exemplary embodiment of a trim component 10 according to the invention. Only a fragment of the film 20 having two lattice members 31.1, 31.2 of the carrier 30 is shown in this exemplary embodiment. As opposed to the first exemplary embodiment, the film 20 has a depression 22b in the lattice void 32. The depression 22b protrudes between the lattice members 31.1, 31.2. Furthermore, the front side 23 of the film 20 is laminated with an upper material 40. The upper material 40 is adhesively bonded to the front side 23 of the film 20 by means of an adhesive 41.

Figure 5:
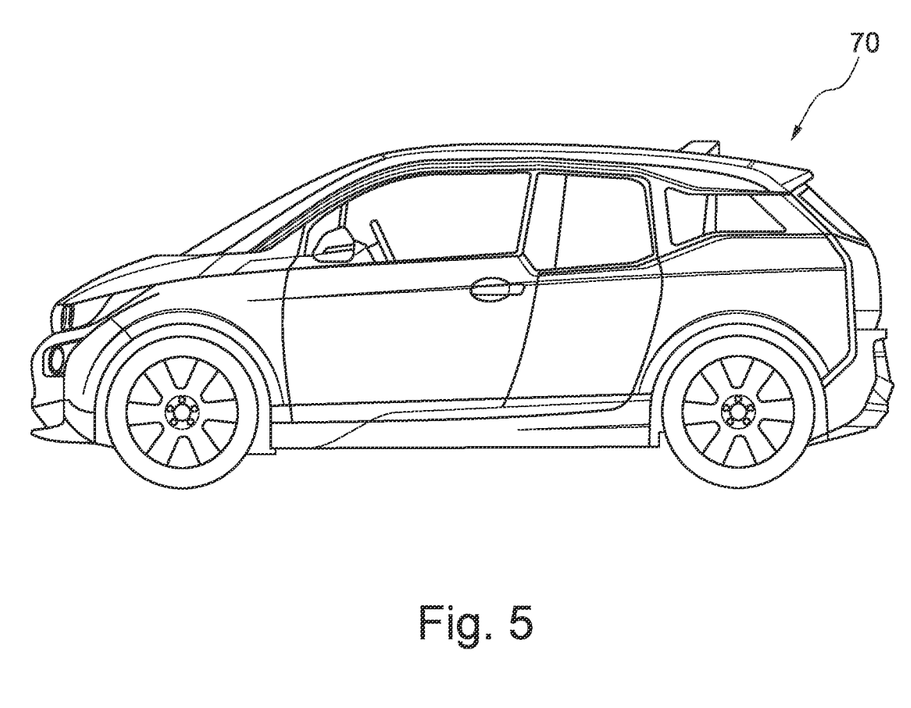
FIG. 5 in a lateral view shows an exemplary embodiment of a motor vehicle according to the invention.

FIG. 5 in a lateral view shows an exemplary embodiment of a motor vehicle 70 according to the invention. For example, the motor vehicle 70 can have the trim component 10 according to the second exemplary embodiment, the trim component 10 not being shown in this illustration and here potentially being configured, for example, as a door trim or a dashboard trim.

Figure 6:
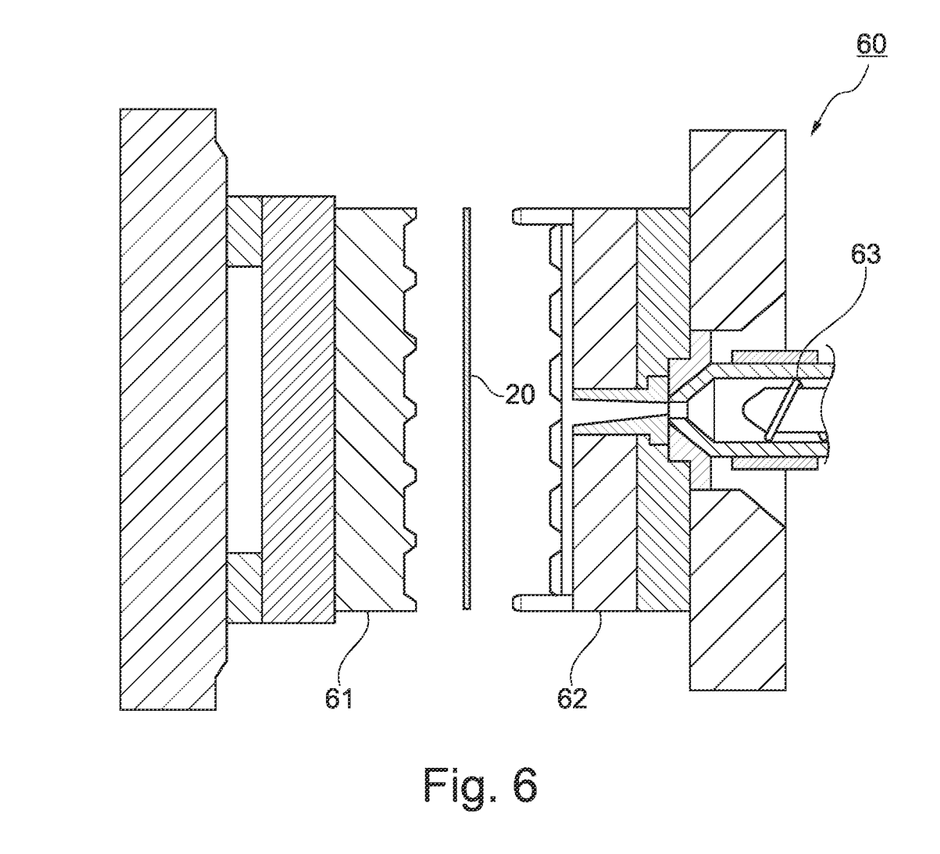
FIG. 6 in a sectional view shows a first step of a method according to the invention for producing the trim component from FIG. 1.

FIG. 6 in a sectional view shows a first step of a method according to the invention for producing the trim component 10 from FIG. 1. The non-molded or planar film 20 herein is disposed between a first tool part 61 of an injection-molding tool 60 and a second tool part 62 of the injection-molding tool 60. The first tool part 61 has the relief structure 21 of the film 20 as the first tool surface. The second tool part 62 has a second tool surface for generating the relief structure 21 which corresponds to the relief structure 21. One of the two tool surfaces, presently the first tool surface (however, this may alternatively be the second tool surface) to this end has depressions, and the other of the two tool surfaces, presently the second tool surface (correspondingly, this may alternatively be the first tool surface) has projections which correspond to the depressions and which when converging the two tool parts 61, 62 engage in one another so as to press or mold, respectively, the film 20 having the relief structure 21. Furthermore, the second tool part 62 has the lattice structure of the carrier 30 and the structure for the frame 33 of the carrier 30. The second tool part 62, or the lattice structure, respectively, and the structure for the frame 33 are fluidically connected to an injection nozzle 63. On account thereof, the lattice structure can be generated by means of a thermoplastic material from the injection nozzle 63, the thermoplastic material being back-molded on the rear side 24 of the film 20.

Figure 7:
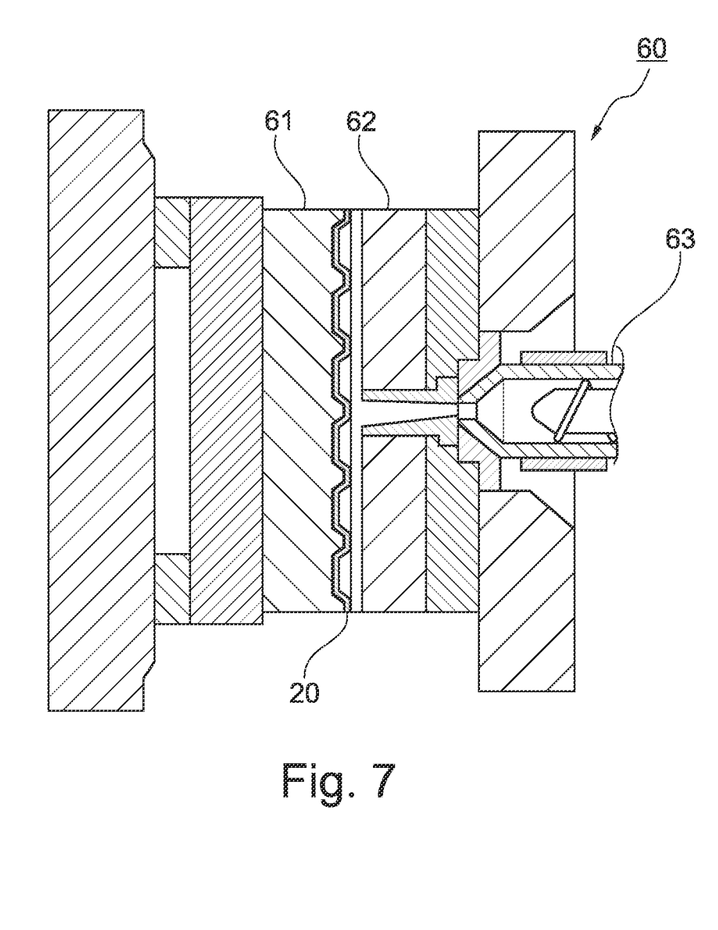
FIG. 7 in a sectional view shows a second step of the method according to the invention from FIG. 6.

FIG. 7 in a sectional view shows a second step of the method according to the invention from FIG. 6. In this second step the film 20 on the circumference thereof has been fixed between the tool parts 61, 62 by converging the tool parts 61, 62 towards one another, and being molded so as to form the relief structure 21. The film 20 now is ready for the back-molding with the thermoplastic material of the carrier 30.

Figure 8:
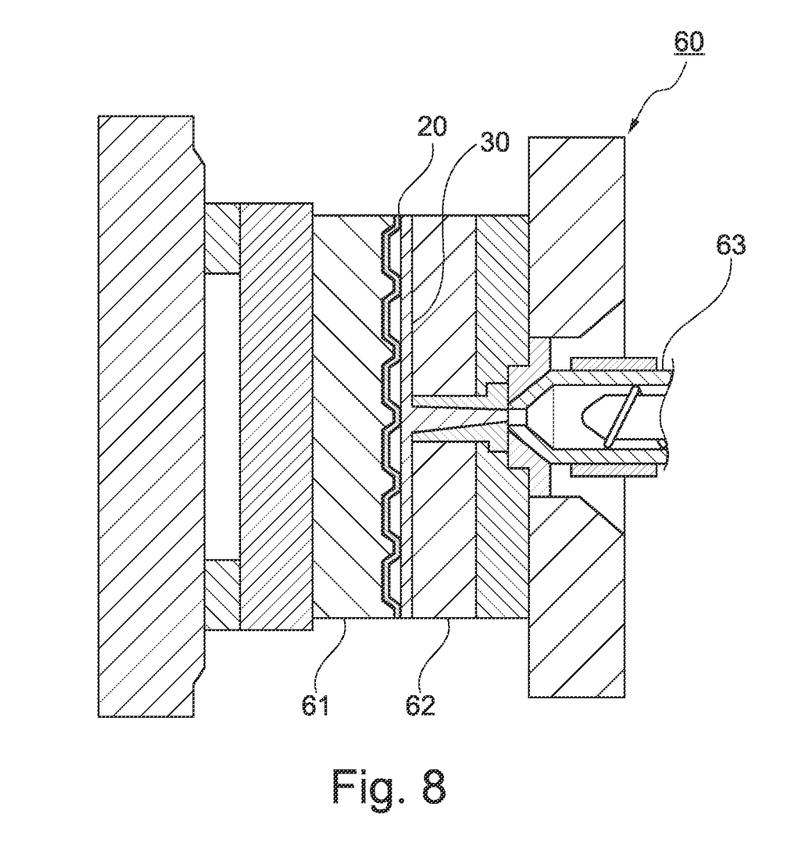
FIG. 8 in a sectional view shows a third step of the method according to the invention from FIG. 6.

FIG. 8 in a sectional view shows a third step of the method according to the invention from FIG. 6. In this third step, the rear side 24 of the film 20 is back-molded with the thermoplastic material of the carrier 30. To this end, the heated thermoplastic material is supplied to the injection nozzle 63, and the injection nozzle 63 presses the thermoplastic material under high pressure against the rear side 24 of the film 20 within the lattice structure. The thermoplastic material of the carrier 30 herein is molded so as to form the lattice structure, and is molded conjointly with the frame 33 in the second tool part 62, and fixes the film 20 at the materially integral connection points in the relief structure 21 of the film 20.

Figure 9:
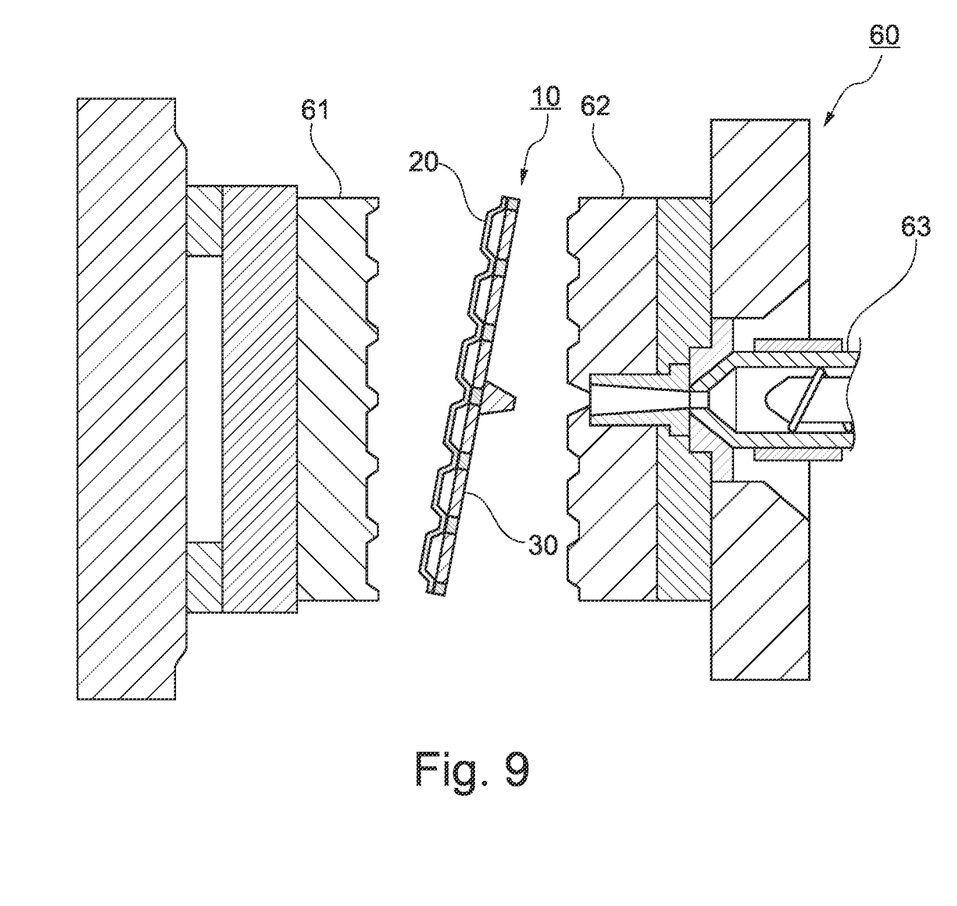
FIG. 9 in a sectional view shows a fourth step of the method according to the invention from FIG. 6.

FIG. 9 in a sectional view shows a fourth step of the method according to the invention from FIG. 6. The thermoplastic material of the carrier 30 in this fourth step is cured, and the trim component 10 completed in this manner has been ejected from the tool parts 61, 62. It can be seen herein that the carrier 30 of the trim component 10 herein still has a superfluous region which in terms of the shape thereof corresponds to a duct in the second tool part 62 through which the thermoplastic material has flowed from the injection nozzle 63 to the lattice structure of the second tool part 62. This superfluous region can simply be severed from the carrier 30.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE CHARACTERS

10 Trim component
20 Film
21 Relief structure
22a Elevation
22b Depression
23 Front side
24 Rear side
30 Carrier
31 Lattice member
32 Lattice void
33 Lattice frame
34 Fastening means
40 Upper material
41 Adhesive
50 Interior component
51 Light unit
60 Injection-molding tool
61 First tool part
62 Second tool part
63 Injection nozzle
70 Motor vehicle

What is claimed is:

1. A trim component for an interior of a motor vehicle, comprising:
   a film; and
   a carrier of a thermoplastic plastics material;
   wherein the film has a relief structure, wherein the carrier has a lattice structure with lattice members, and wherein the carrier is back-molded on a rear side of the film such that the lattice members are connected in a materially integral manner to the rear side of the film;

wherein the lattice members enclose lattice voids, wherein the film in a region of the lattice voids in relation to the lattice members has elevations and/or depressions which form the relief structure, and wherein the elevations are convex in relation to the lattice members and are raised in relation to the lattice members and the depressions are concave in relation to the lattice members and protrude between the lattice members.

2. The trim component according to claim 1, wherein the film is permeable to light.

3. A trim component for an interior of a motor vehicle, comprising:
   a film; and
   a carrier of a thermoplastic plastics material;
   wherein the film has a relief structure, wherein the carrier has a lattice structure with lattice members, and wherein the carrier is back-molded on a rear side of the film such that the lattice members are connected in a materially integral manner to the rear side of the film;
   wherein the film has a thickness in a range from 0.3 mm to 3 mm.

4. The trim component according to claim 1, wherein the film is composed of a thermoplastic plastics material.

5. The trim component according to claim 1, wherein the carrier has a fastener integrally molded on the carrier and wherein the fastener is fastenable to a receptacle of a component of the interior of the motor vehicle.

6. The trim component according to claim 1, wherein a front side of the film is laminated with an upper material.

7. An interior component for an interior of a motor vehicle, comprising:
   the trim component according to claim 1; and
   a light unit, wherein the light unit is disposed behind the rear side of the film such that the light unit is able to shine through the film from the rear side.

8. A method for producing a trim component for an interior of a motor vehicle, comprising the steps of:
   a) disposing a film between a first tool part having a relief structure form and a second tool part having a lattice structure form and an injection nozzle that is fluidically connected to the lattice structure form;
   b) fixing the film between the first tool part and the second tool part; and
   c) back-molding a rear side of the film with a thermoplastic material from the injection nozzle such that the thermoplastic material is molded to form a carrier with a lattice structure, wherein the lattice structure has lattice members, and wherein the carrier is back-molded on the rear side of the film such that the lattice members are connected in a materially integral manner to the rear side of the film.

* * * * *